US011747562B2

(12) United States Patent
Bian (10) Patent No.: US 11,747,562 B2
(45) Date of Patent: *Sep. 5, 2023

(54) WAVEGUIDE ABSORBERS (71) Applicant: GLOBALFOUNDRIES U.S. INC., Malta, NY (US)

(72) Inventor: Yusheng Bian, Ballston Lake, NY (US)

(73) Assignee: GLOBALFOUNDRIES U.S. INC., Malta, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,156

(22) Filed: May 6, 2022

(65) Prior Publication Data

US 2022/0260778 A1 Aug. 18, 2022

Related U.S. Application Data (63) Continuation of application No. 17/031,032, filed on Sep. 24, 2020, now Pat. No. 11,353,654.

(51) Int. Cl.
*G02B 6/124* (2006.01)
*G02B 6/12* (2006.01)

(52) U.S. Cl.
CPC .... *G02B 6/124* (2013.01); *G02B 2006/12061* (2013.01); *G02B 2006/12126* (2013.01)

(58) Field of Classification Search
CPC ..................................... G02B 6/124
See application file for complete search history.

(56) References Cited

U.S. PATENT DOCUMENTS

| 2,557,110 | A | | 6/1951 | Jaynes |
| 2,619,538 | A | | 11/1952 | Grant |
| 3,787,871 | A | | 1/1974 | Reese |
| 4,799,031 | A | | 1/1989 | Lang et al. |
| 5,109,446 | A | | 4/1992 | Kaltschmidt |
| 5,994,724 | A | | 11/1999 | Morikawa |
| 6,174,648 | B1 | * | 1/2001 | Terao .................. G02B 6/02209 430/5 |
| 6,563,966 | B1 | * | 5/2003 | Tang .................... H01Q 3/2682 385/32 |
| 6,590,697 | B2 | | 7/2003 | Vaganov |
| 6,643,065 | B1 | | 11/2003 | Silberman |
| 7,002,429 | B2 | | 2/2006 | Asao et al. |
| 7,043,108 | B1 | | 5/2006 | Olsen |

(Continued)

FOREIGN PATENT DOCUMENTS

| CN | 1515917 A * 7/2004 ......... G02B 6/02138 |
| EP | 1544967 6/2005 |

(Continued)

OTHER PUBLICATIONS

German Office Action dated Jul. 29, 2022 in related Application No. 10 2021 122 575.2, 6 pages.

(Continued)

*Primary Examiner* — Charlie Y Peng
(74) *Attorney, Agent, or Firm* — Francois Pagette; Andrew M. Calderon; Calderon Safran & Cole, P.C.

(57) ABSTRACT

The present disclosure relates to semiconductor structures and, more particularly, to spiral waveguide absorbers and methods of manufacture. The structure includes: a photonics component; and a waveguide absorber with a grating pattern coupled to a node of the photonics component.

20 Claims, 8 Drawing Sheets

(56) References Cited

U.S. PATENT DOCUMENTS

| | | |
|---|---|---|
| 9,383,512 B2 | 7/2016 | Evans et al. |
| 9,529,128 B2 | 12/2016 | Santori |
| 10,359,569 B2 | 7/2019 | Dumais |
| 10,861,682 B2 | 12/2020 | O'Banion |
| 2003/0030814 A1 | 2/2003 | Osinski et al. |
| 2014/0044391 A1 | 2/2014 | Iizuka et al. |
| 2014/0185979 A1 | 7/2014 | Evans et al. |
| 2014/0217269 A1 | 8/2014 | Guo et al. |
| 2021/0036479 A1 | 2/2021 | Bian et al. |

FOREIGN PATENT DOCUMENTS

| | | |
|---|---|---|
| WO | 2010122329 | 10/2010 |
| WO | WO-2020234098 A1 * | 11/2020 |
| WO | 2021145768 | 7/2021 |

OTHER PUBLICATIONS

English Translation of the German Office Action dated Jul. 29, 2022 in related Application No. 10 2021 122 575.2, 1 page.

Office Action in U.S. Appl. No. 16/935,854 dated Sep. 2, 2022, 11 pages.

Response to Office Action in U.S. Appl. No. 16/935,854 dated Oct. 25, 2022, 12 pages.

Liu et al., "A Thin X-Band Microwave Absorber Using a Center Shorted Spiral Medium", IEEE Antennas and Wireless Propagation Letters, vol. 8, 2009, 4 pages.

Varadan et al., "Smart skin spiral antenna with chiral absorber", downloaded Aug. 23, 2020; SPIEDigitalLibrary.org, conference-proceedings-of-spie, 13 pages.

Gong et al., "Perfect absorber supported by optical Tamm states in plasmonic waveguide", Optics Express, vol. 19, No. 19, Sep. 12, 2011, 6 pages.

Giewont et al., "300-mm Monolithic Silicon Photonics Foundry Technology", IEEE Journal of Selected Topics in Quantum Electronics, vol. 25, No. 5, Sep./Oct. 2019, 12 pages.

Rakowski et al., "45nm CMOS—Silicon Photonics Monolithic Technology (45CLO) for next-generation, low power and high speed optical interconnects", OFC 2020, 3 pages.

Specification and drawings for U.S. Appl. No. 16/531,819, filed Aug. 5, 2019, 25 pages.

* cited by examiner

WAVEGUIDE ABSORBERS

FIELD OF THE INVENTION

The present disclosure relates to semiconductor structures and, more particularly, to waveguide absorbers and methods of manufacture.

BACKGROUND

Semiconductor optical waveguide structures (e.g., photonic components) are an important component of integrated optoelectronic systems. For example, a semiconductor optical waveguide structure is capable of guiding optical waves (e.g., light) with minimal loss of energy by restricting expansion of the light into the surrounding substrate. The optical waveguide structure can be used in many different applications including, e.g., semiconductor lasers, optical filters, switches, modulators, isolators, and photodetectors. The use of semiconductor material also enables monolithic integration into optoelectronic devices using known fabrication techniques.

Open or unconnected ports or other termination points of the photonics device can result in leakage or backscatter of the optical signal back into the chip. This can also cause crosstalk with other photonic devices, as well as overall interference of the optical signal. To prevent such issues from occurring, an absorber is coupled to the open or unconnected ports or other termination points of the photonics device. The absorbers are known to be manufactured from Ge material as they are easily integrated into the fabrication processes of the photonics devices. However, Ge absorbers suffer from relatively high optical return loss (e.g., back-reflection and backscatter) which, in turn, can significantly impede the optical strength of the signal. Backscattering into lasers can result in instability and additional laser noise. Additionally, it can lead to degraded high-speed signal integrity and increased bit-error-rate of communication links.

SUMMARY

In an aspect of the disclosure, a structure comprises: a photonics component; and a waveguide absorber with a grating pattern coupled to a node of the photonics component.

In an aspect of the disclosure, a structure comprising: a waveguide absorber comprising discontinuous semiconductor material; and insulator material over the waveguide absorber and within gaps formed between the discontinuous semiconductor material.

In an aspect of the disclosure, a structure comprising: a semiconductor waveguide component; a concentrically configured spiraled waveguide absorber composed of semiconductor material with voids forming a grating pattern between the semiconductor material of the concentrically configured spiraled waveguide absorber; and insulator material over the concentrically spiraled waveguide absorber and within the voids.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to waveguide absorbers and methods of manufacture. More specifically, the present disclosure relates to ultra-compact subwavelength waveguide absorbers with grating patterns and methods of manufacture. In embodiments, the ultra-compact subwavelength waveguide absorbers can have a spiral configuration which includes a grating pattern, e.g., etched portions, which can be of different patterns and periods. Advantageously, the grating patterns provide significant improvement performance over continuous Si spiral waveguide absorbers, in additional to significantly reducing optical return loss compared to Ge absorbers. In addition, the grating patterns offer an efficient way to form an absorber without the need of introducing absorption material such as Ge material, while also being compatible with known process flows and without the need of introducing additional fabrication steps.

In embodiments, the spiral waveguide absorbers can be made from silicon (Si), polysilicon or silicon nitride (SiN), as examples. The grating patterns include partially or fully etched sections (e.g., voids between semiconductor material of the spiral waveguide absorber, thinned portions or other patterns) to efficiently absorb incoming light with minimized back reflection. Moreover, in embodiments, the grating patterns will guide light instead of radiating or blocking the light. Further, by implementing the spiral configuration, the radiation losses will be accumulated through the curved configurations to attenuate light intensity, with the light propagating within the plane of the spiral configuration. In embodiments, the spiral configuration can be circular, rectangular (or other quadrilateral) with or without curved or rounded corners, oval, elliptical, octagonal, diamond or other shapes as contemplated herein.

The waveguide absorbers of the present disclosure can be manufactured in a number of ways using a number of different tools. In general, though, the methodologies and tools are used to form structures with dimensions in the micrometer and nanometer scale. The methodologies, i.e., technologies, employed to manufacture the absorber structures of the present disclosure have been adopted from integrated circuit (IC) technology. For example, the structures are built on wafers and are realized in films of material patterned by photolithographic processes on the top of a wafer. In particular, the fabrication of the waveguide absorbers uses three basic building blocks: (i) deposition of thin films of material on a substrate, (ii) applying a patterned mask on top of the films by photolithographic imaging, and (iii) etching the films selectively to the mask.

Figure 1:
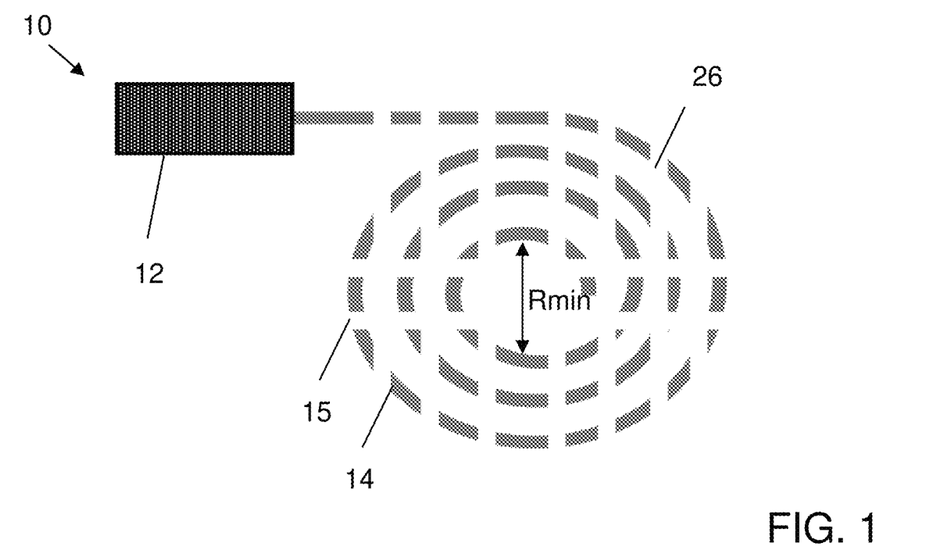
FIG. 1 shows a spiral waveguide absorber with a grating pattern, amongst other features, and respective fabrication processes in accordance with aspects of the present disclosure.

FIG. 1 shows a spiral waveguide absorber with a grating pattern, amongst other features. In particular, the structure 10 of FIG. 1 includes one or more photonics component 12 coupled to a spiral waveguide absorber 14 having a grating pattern 15, e.g., voids between the semiconductor material of the spiral waveguide absorber 14. In embodiments, the spiral waveguide absorber 14 is coupled to an open or unconnected port or other termination point (hereinafter referred to as a node) of the one or more photonics component 12.

The photonics component 12 can be representative of one or more photonic waveguide component composed of semiconductor material including, e.g., Si or SiN. The Si material can be, for example, silicon-on-insulator technologies; whereas, the SiN material can be fully or partially etched material on an oxide material. In the Si implementation, the photonics component 12 can be patterned directly from the Si material of the silicon-on-insulator technologies using conventional CMOS fabrication processes as discussed herein, including a thinning of the Si material.

Still referring to FIG. 1, the spiral waveguide absorber 14 is provided in a spiral configuration composed of Si material, SiN material or polysilicon material, as examples. In embodiments, any combination of materials disclosed herein for the one or more photonics components 12 can be used with any materials disclosed herein for the spiral waveguide absorber 14. In the Si configuration, the spiral waveguide absorber 14 can be provided in a monolithic integration with the photonic component 12 (e.g., waveguide structures). More specifically, in the Si configuration, the Si material of the spiral waveguide absorber 14 is composed of the same semiconductor (e.g. silicon)-on-insulator material as the photonic components 12; whereas, in the SiN or polysilicon implementation, the spiral waveguide absorber 14 can be fully or partially etched material on an oxide material. Also, in any of the different configurations described herein, the waveguide absorber 14 can be planar.

The waveguide absorber 14 is configured in a spiral configuration of concentrically positioned spirals with a grating pattern 15, e.g., voids filled with an insulator material 26. In embodiments, the spiral can be circles, ovals, rectangular (or other quadrilateral) with or without rounded corners, octagonal, elliptical, diamond, etc. Moreover, the spiral waveguide absorber 14 can include any number of concentric portions, e.g., four, depending on the desired loss mechanism and material composition implemented in fabricating of the spiral waveguide absorber 14 as described herein.

Still referring to FIG. 1, the grating pattern 15 is composed of alternating voids or gaps between the semiconductor material of the spiral waveguide absorber 14. In this way, the spiral waveguide absorber 14 is not a continuous structure, i.e., it is discontinuous with alternating semiconductor material and voids filled with insulator material 26. In embodiments, the voids are etched portions of the semiconductor material of the spiral waveguide absorber 14. As in each of the embodiments, the insulator material 26, e.g., oxide material, is provided within the voids of the grating pattern 15 to absorb light.

As described herein, the spiral configuration and grating pattern 15 can be fabricated using conventional lithography and etching processes, followed by a depiction of the insulator material 26. For example, in the Si implementation, a resist formed over the Si material is exposed to energy (light) to form a pattern (opening). An etching process with a selective chemistry, e.g., reactive ion etching (RIE), will be used to form one or more patterns in the Si material. Following the resist removal by a conventional oxygen ashing process or other known stripants, the insulator material 26 can be deposited over the spiral waveguide absorber 14 and within the voids forming the grating pattern 15.

In embodiments, the grating pattern 15 can have a gap ratio that depends on the thickness and length of the material used for the spiral waveguide absorber. Illustratively, the grating pattern 15 can have a duty cycle, e.g., non-etched portions/pitch of the gratings, of 0.2-0.8 for the solid Si material. In addition, as in each of the different embodiments, the grating pattern 15 can be periodic or non-periodic (e.g., apodized). And, as should be understood, the grating pattern 15 can vary based on the different performance requirements of the spiral waveguide absorber 14. These performance requirements can be based on different variables including, e.g., type of material, number of spirals, tightness of spirals, thickness of material, etc. These same parameters are applicable to each of the different configurations of the waveguide absorber with grating patterns described herein.

Depending on the dimensions of the spiral waveguide absorber 14 (e.g., width, thickness) and the material composition, the radius and number of the spirals can vary in the spiral waveguide absorber 14. For example, for a Si waveguide absorber (n=3.5 @ lambda=1310 nm), the configuration can be, e.g., 5 spirals, Rmin=1 um, (width: 0.3~0.4*lambda, thickness: 0.15~0.2*lambda) @lambda=1310 nm. For a SiN spiral waveguide absorber (n=2), the material index is smaller and confinement is worse so the bending loss is higher and, hence, less spiral/turns or smaller bending radius would be required, e.g., 3 spirals, Rmin=0.8 um. Moreover, if the input light is working at the transverse-electric (TE) mode, it is possible to shrink the width of the spiral waveguide absorber 14 to reduce the confinement and increase the bending loss. For example, in the TE mode, it is contemplated to reduce the number of the spirals or have a smaller bending radius or both. On the other hand, if the input light is working at the transverse-magnetic (TM) mode, it is possible to shrink the spiral waveguide absorber 14 thickness to reduce the confinement and increase the bending loss. In this scenario, it is possible to reduce the number of the spirals or have a smaller bending radius or both. In addition, with narrow SiN spiral waveguide absorber designs with tight bends, the footprint can be pushed below, e.g., 3 µm*3 µm.

Benefits are apparent by implementing the spiral waveguide absorber with the grating structure. In an example with the innermost spiral at a radius of approximately 1 µm and the material composition being Si, modeling results show a back reflection of −43 dB, an insertion loss of 63 dB and a transmission % of 5e-5% for the spiral configuration with grating pattern. In addition, it has been found that a spiral waveguide absorber composed of SiN material with the grating pattern will have a back reflection of −51 dB, an insertion loss of 68 dB and a transmission % of 1.5e-5%. In comparison, for a continuous spiral Si waveguide absorber, the back reflection is −38 dB, the insertion loss is 51.2 dB and the transmission % is 7.4e-4%. Also, for a conventional straight Ge absorber, the back reflection is −18.7 dB, the insertion loss is 4.7 dB and the transmission % is 34%. Accordingly, the spiral waveguide absorbers composed of Si or SiN with grating patterns exhibit significantly lower back reflection, better absorption (higher attenuation) and decreased light transmission compared to Ge-based absorbers or continuous spiral Si absorbers. Also, due to the increased performance characteristics of spiral waveguide absorbers 14 described herein, it is now possible to feature a smaller footprint, e.g., approximately a 60% area reduction.

Figure 2:
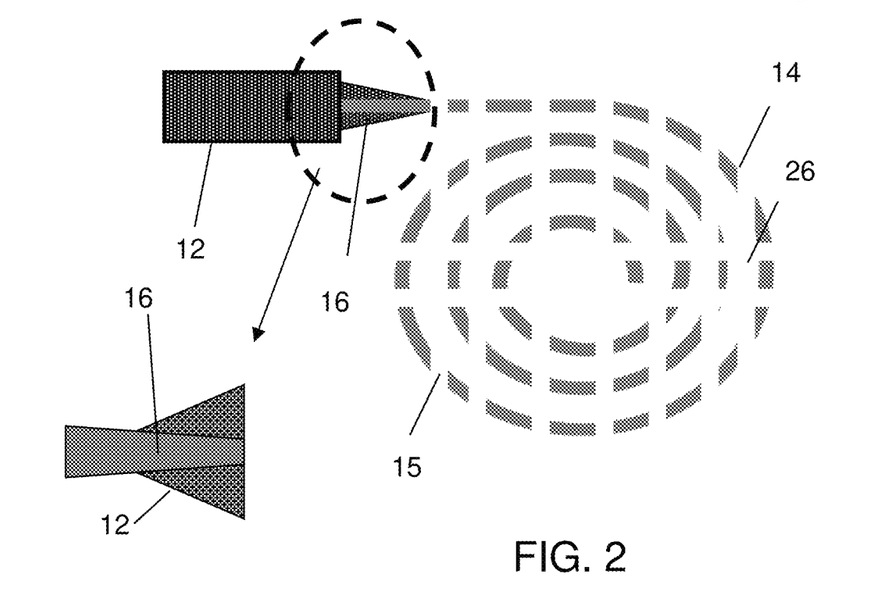
FIG. 2 shows a coupler interposed between the spiral waveguide absorber and a photonics component in accordance with aspects of the present disclosure.

FIG. 2 shows a coupler 16 interposed between the spiral waveguide absorber 14 and the photonics components 12. In embodiments, the coupler 16 can be used with any of the embodiments described herein when the material composition of the spiral waveguide absorber 14 is mismatched with the material composition of the photonics components 12 (e.g., not the same materials). In embodiments, the coupler 16 is tapered with the photonics component 12 having a larger area and/or cross-section than the tapered coupler 16, and can be composed of SiN, Si, Ge and/or polysilicon depending on the materials used with the spiral waveguide absorber 14 and the photonics component 12.

For example, in embodiments, the coupler 16 can include a tapered SiN component in combination with an overlaid (overlapping) tapered Si component when the photonics component 12 is SiN material and the spiral waveguide absorber 14 is Si material, respectively. In yet another embodiment, the coupler 16 can include a tapered Si component in combination with an overlaid (overlapping) tapered SiN component when the photonics component 12 is Si material and the spiral waveguide absorber 14 is SiN material, respectively. In still another embodiment, the coupler 16 can include a tapered SiN component in combination with an overlaid (overlapping) tapered polysilicon component when the photonics component 12 is Si material or SiN material and the spiral waveguide absorber 14 is polysilicon material, respectively. Other tapered configurations are also contemplated herein.

In further embodiments, the coupler 16 can be composed of a single material (e.g. Si or SiN), but with different etching depths, e.g., the component for the waveguide is fully-etched Si waveguide and the component for the spiral waveguide absorber is partially etched Si waveguide. In further embodiments, the coupler 16 can be composed of different components based on a partially etched spiral Si waveguide absorber, but with different etching depths (e.g., slab thicknesses). In yet further embodiments, the coupler 16 can be composed of two different materials (e.g. Si and SiN).

Figure 3:
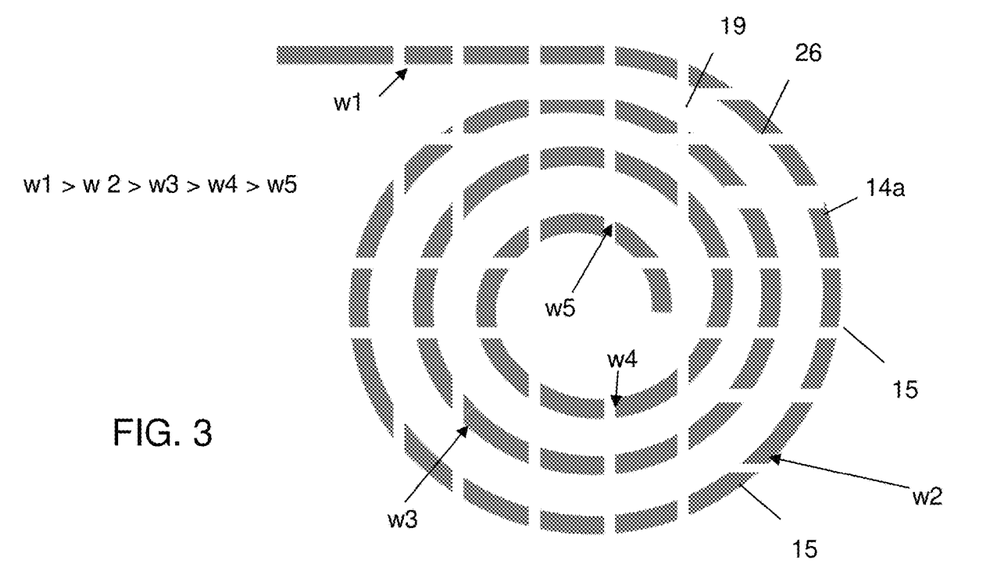
FIG. 3 shows the spiral waveguide absorber with a varying width along its length, amongst other features, and respective fabrication processes in accordance with aspects of the present disclosure.

FIG. 3 shows a varying width spiral waveguide absorber 14a with grating pattern 15. In this representation, the width of the spiral waveguide absorber 14a will gradually decrease starting from the starting point (e.g., where is couples with the photonics components 12) to its terminal point (e.g., end), i.e., the width of the spiral waveguide varies along the turns (propagation length). For example, w1>w2>w3>w4>w5. It should be understood by those of ordinary skill in the art that different widths and placement of the transition of the widths is contemplated herein and that the example shown in FIG. 3 is a non-limiting illustration of a configuration with gradually decreasing widths. By way of example, the widths can range from about 0.05*lambda to about 5*lambda.

Figure 4:
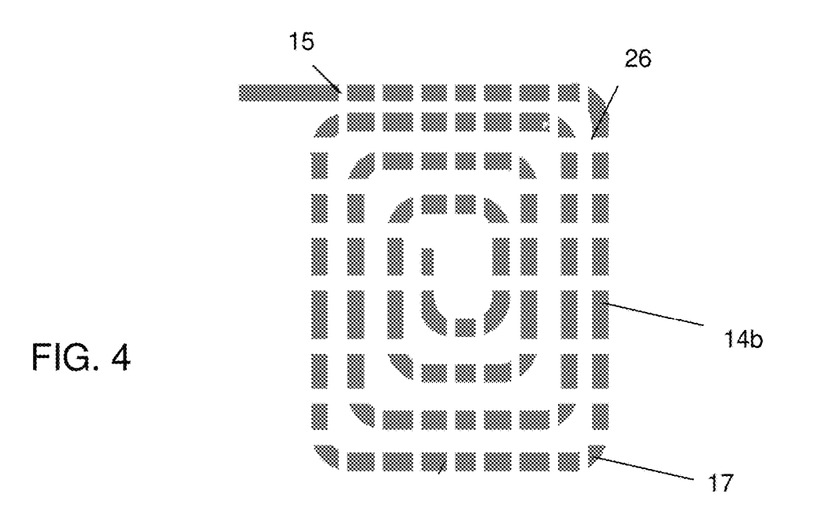
FIG. 4 shows a rectangular spiral waveguide absorber with the grating pattern, amongst other features, and respective fabrication processes in accordance with aspects of the present disclosure.

FIG. 4 shows a quadrilateral (e.g., rectangular) spiral waveguide absorber 14b with the grating pattern 15. In this spiral configuration, the spiral waveguide absorber 14b includes rounded or curved corners 17. And, similar to the spiral configuration shown in FIG. 1, for example, the spiral waveguide absorber 14b can include any number of concentric features, e.g., four, and material compositions, e.g., Si, SiN or polysilicon, depending on the desired return loss of the spiral waveguide absorber 14b. Moreover, each leg or each concentrically positioned set of adjacent legs or portions thereof can have different widths, much like the spiral waveguide absorber shown in FIG. 3. For example, the width of the legs or concentrically positioned set of adjacent legs can gradually narrow from the starting point to its termination point.

Figure 5:
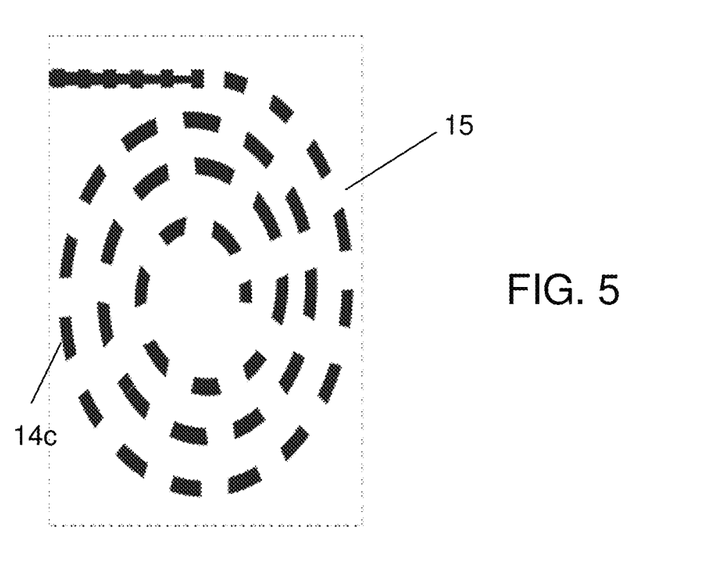
FIG. 5 shows a spiral waveguide absorber in an oval or elliptical spiral configuration with the grating pattern, amongst other features, and respective fabrication processes in accordance with aspects of the present disclosure.

FIG. 5 shows a spiral waveguide absorber 14c in a rounded configuration (e.g., an oval or elliptical spiral configuration) with the grating pattern 15. In this spiral configuration, the spiral waveguide absorber 14c can include any number of concentric features, e.g., four, and material compositions, e.g., Si, SiN or polysilicon, depending on the desired return loss of the spiral waveguide absorber 14c. It is also contemplated that the oval or elliptical spiral configuration can gradually decrease in width, much like the spiral waveguide absorber shown in FIG. 3.

Figure 6A:
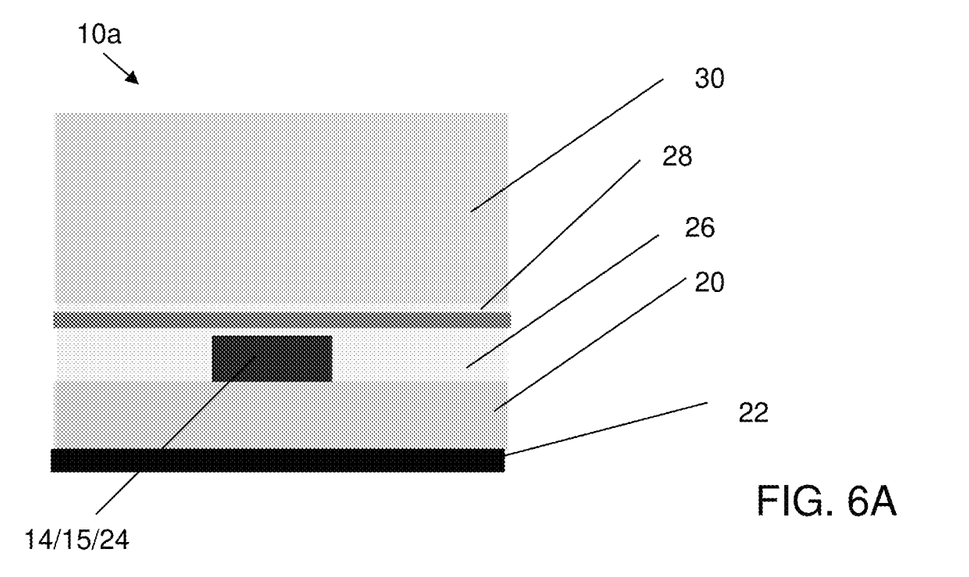
FIGS. 6A-6C show cross-sectional views of the spiral waveguide absorber with different material compositions.
Figure 6B:
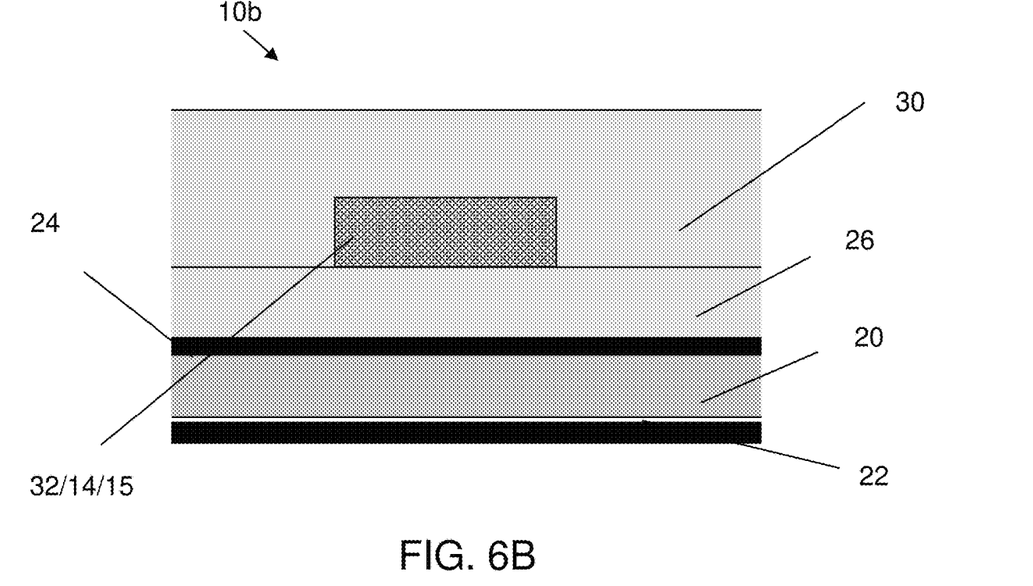
Figure 6C:
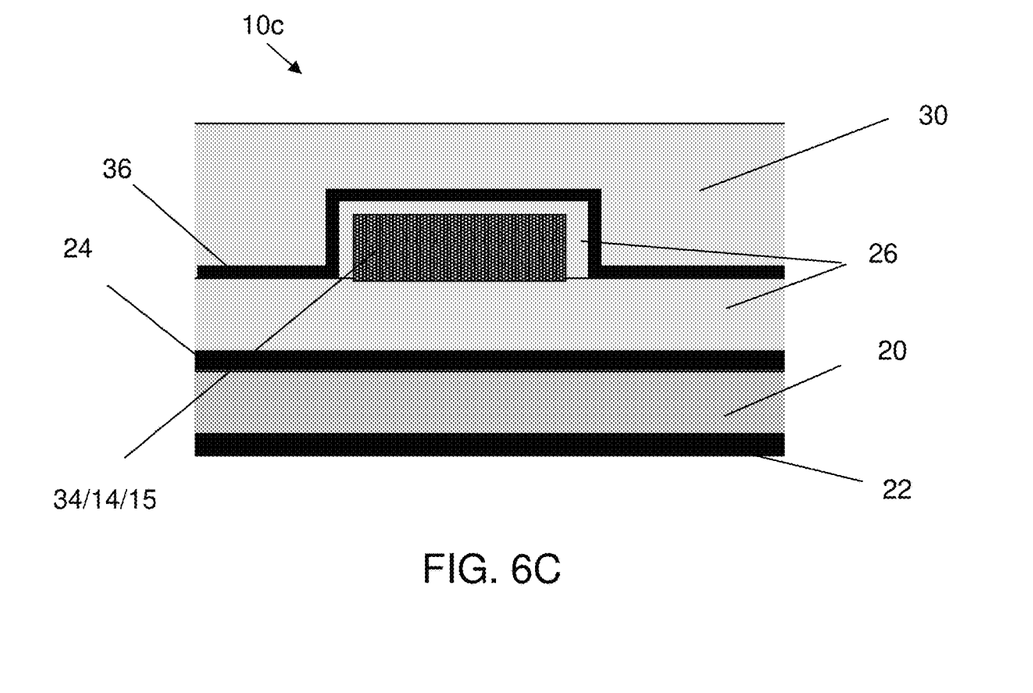

FIGS. 6A-6C show cross-sectional views of the spiral waveguide absorber with different material compositions. For example, FIG. 6A shows a spiral waveguide absorber 14 composed of Si material; whereas, FIG. 6B shows the spiral waveguide absorber 14 composed of SiN material and FIG. 6C shows the spiral waveguide absorber 14 composed of polysilicon material. In each of FIGS. 6A-6C, the grating pattern 15 can be any of the configurations described herein.

In FIG. 6A, the structure 10a includes the spiral waveguide absorber 14 composed of Si material of silicon on insulator technologies. In this implementation, the structure 10a includes an insulator layer 20 on top of a semiconductor layer 22. The insulator layer 20 comprises any suitable material, including silicon oxide, sapphire, other suitable insulating materials, and/or combinations thereof. An exemplary insulator layer 20 may be a buried oxide layer (BOX). The insulator layer 20 can be formed by any suitable process, such as separation by implantation of oxygen (SIMOX), oxidation, deposition, and/or other suitable process.

Still referring to FIG. 6A, a semiconductor layer 24 is formed on top of the insulator layer 20 to form a silicon-on-insulator (SOI) substrate. The semiconductor layer 24 can be fabricated using wafer bonding, and/or other suitable methods. The semiconductor layer 24 may comprise any suitable crystallographic orientation (e.g., a (100), (110), (111), or (001) crystallographic orientation).

In this embodiment, the semiconductor layer 24 is patterned to form the spiral waveguide absorber 14 and the grating pattern 15 (and, in an example, the photonics component). An insulator material 26, e.g., oxide, is deposited on the spiral waveguide absorber 14 and within the grating pattern 15, e.g., voids or etched portion, using conventional deposition methods such as, for example, a chemical vapor deposition (CVD) process. An optional nitride material 28 is deposited on the insulator material 26, followed by the formation of back end of line structures 30 as is known in the art such that no further explanation is required for a complete understanding of the disclosure. The back end of the line structures 30 can include wirings, interconnects, etc.

In FIG. 6B, the structure 10b comprises the spiral waveguide absorber 14 composed of SiN material 32 above the silicon on insulator technology, e.g., layers 20, 22, 24. In alternative embodiments, the layers 20, 22, 24 can also be representative of a bulk semiconductor material. In this implementation, the SiN material 32 can be deposited on an oxide or other insulator material 26 using conventional deposition processes, e.g., CVD. Following the deposition process, the SiN material 32 can be patterned to form the spiral waveguide absorber 14 and the grating pattern 15 using conventional lithography and etching processes as already described herein. The back end of line structures 30 are formed over the spiral waveguide absorber 14, as is known in the art. In this implementation, the back end of line structures 30 includes insulator material, e.g., oxide, deposited on the spiral waveguide absorber 14 and within the grating pattern 15, e.g., voids or etched portion.

In FIG. 6C, the structure 10c comprises the spiral waveguide absorber 14 composed of polysilicon material 34 above the silicon on insulator technology, e.g., layers 20, 22, 24. In alternative embodiments, the layers 20, 22, 24 can also be representative of a bulk semiconductor material. In this implementation, the polysilicon material 34 can be deposited on an oxide or other insulator material 26 using conventional deposition processes, e.g., CVD. Following the deposition process, the polysilicon material 34 can be patterned to form the spiral waveguide absorber 14 and the grating pattern 15 using conventional lithography and etching processes as already described herein. A nitride layer 36 is deposited over the spiral waveguide absorber 14 and the grating pattern 15, with an intervening insulator material 26, e.g., oxide, deposited on the spiral waveguide absorber 14 and within the grating pattern 15, e.g., voids or etch portion. The back end of the line structures 30 are formed over the nitride material 36.

Figure 7A:
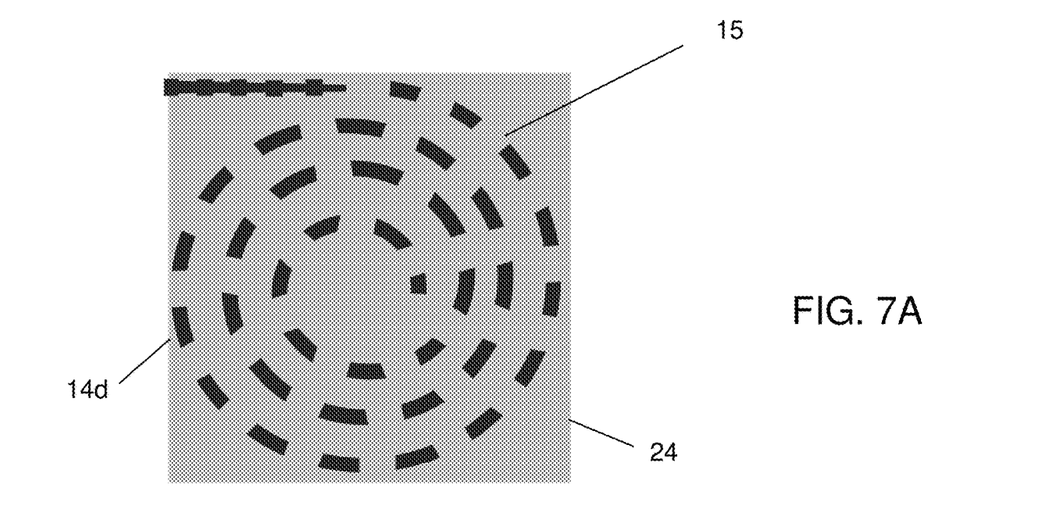
FIGS. 7A and 7B show a partially etched spiral waveguide structure, amongst other features, and respective fabrication processes in accordance with aspects of the present disclosure.
Figure 7B:
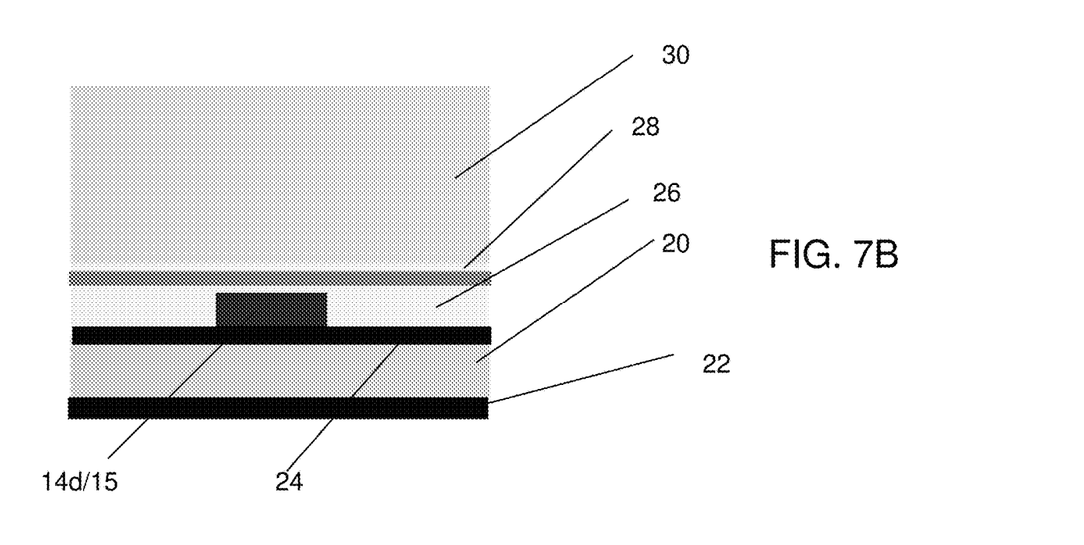

FIGS. 7A and 7B show a partially etched spiral waveguide structure 14d in accordance with aspects of the present disclosure. More specifically, FIG. 7A shows a plan view of a partially etched waveguide structure 14d; whereas, FIG. 7B shows a cross-sectional view of the partially etched waveguide structure 14d. As shown in each of these views, the waveguide structure 14d includes a slab or base of thinned semiconductor material 24 composed of the same semiconductor material as the waveguide structure 14b, e.g., Si material of the silicon on insulator technology. To fabricate this structure 10b, a timed etch can be used to thin the slab or base of semiconductor material 24, as well as form the grating pattern 15. In this way and as with the embodiments shown in FIGS. 8 and 9 described herein, the grating pattern 15 is partially removed material of the base; whereas, the material of the remaining waveguide structure 14d is non-etch material of the base, itself, providing a monolithic structure. As in the previous embodiments, insulator material 26 is provided within the grating pattern, e.g., voids of etched material.

Figure 8:
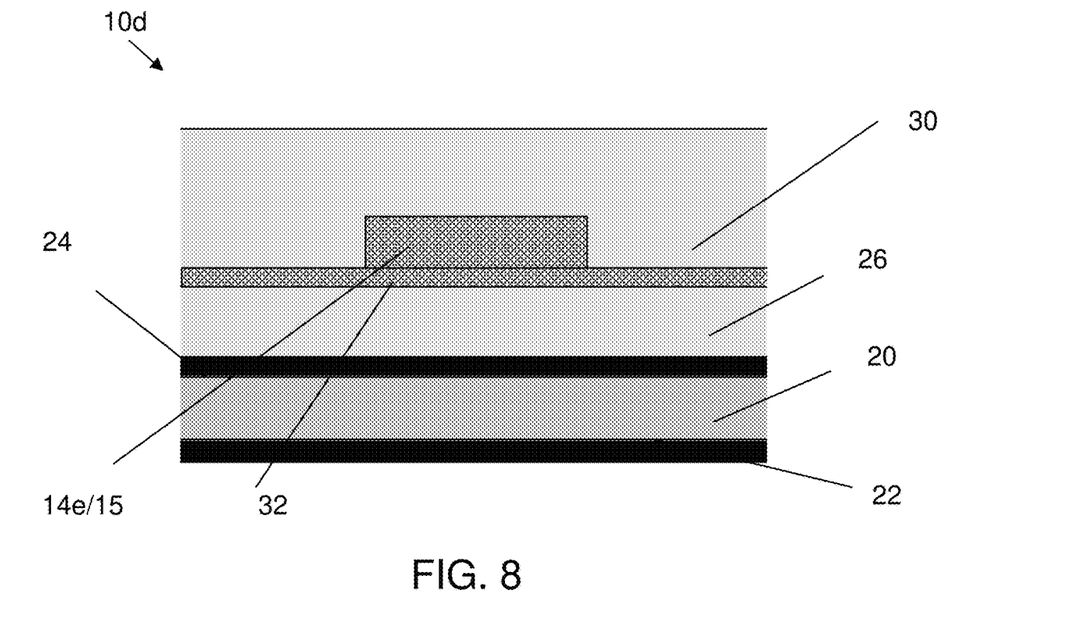
FIG. 8 show a partially etched spiral waveguide structure, amongst other features, and respective fabrication processes in accordance with additional aspects of the present disclosure.

FIG. 8 shows a structure 10d comprising a partially etched spiral waveguide structure 14e composed of SiN material.

As shown in this cross-sectional view, the partially etched waveguide structure 14e includes a slab or base of the SiN material 32. Accordingly, the slab or base of the SiN material 32 is the same material as the spiral waveguide structure 14e. To fabricate this structure, a timed etch can be used to thin the slab or base of the SiN material 32 and form the grating pattern 15 of the waveguide structure 14e. As in the previous embodiments, insulator material 26 is provided within the grating pattern 15, e.g., voids of etched material.

Figure 9:
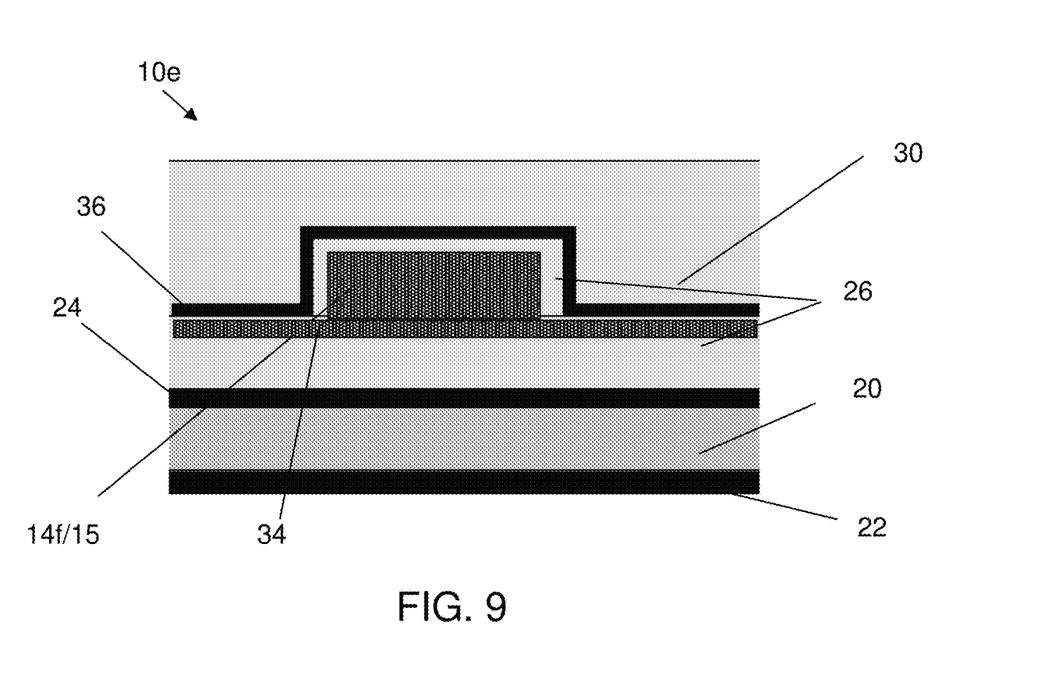
FIG. 9 shows a partially etched spiral waveguide structure, amongst other features, and respective fabrication processes in accordance with additional aspects of the present disclosure.

FIG. 9 shows a structure 10e comprising a partially etched spiral waveguide structure 14f composed of polysilicon material 34. As shown in this cross-sectional view, the waveguide structure 14f includes a slab or base of the polysilicon material 34. Accordingly, the slab or base of the polysilicon material 34 is the same material as the spiral waveguide structure 14f. To fabricate this structure, a timed etch can be used to thin the slab or base of the polysilicon material 34, as well as form the grating pattern 15 of the partially etched waveguide structure 14f. As in the previous embodiments, insulator material 26 is provided within the grating pattern 15, e.g., voids of etched material.

Figure 10:
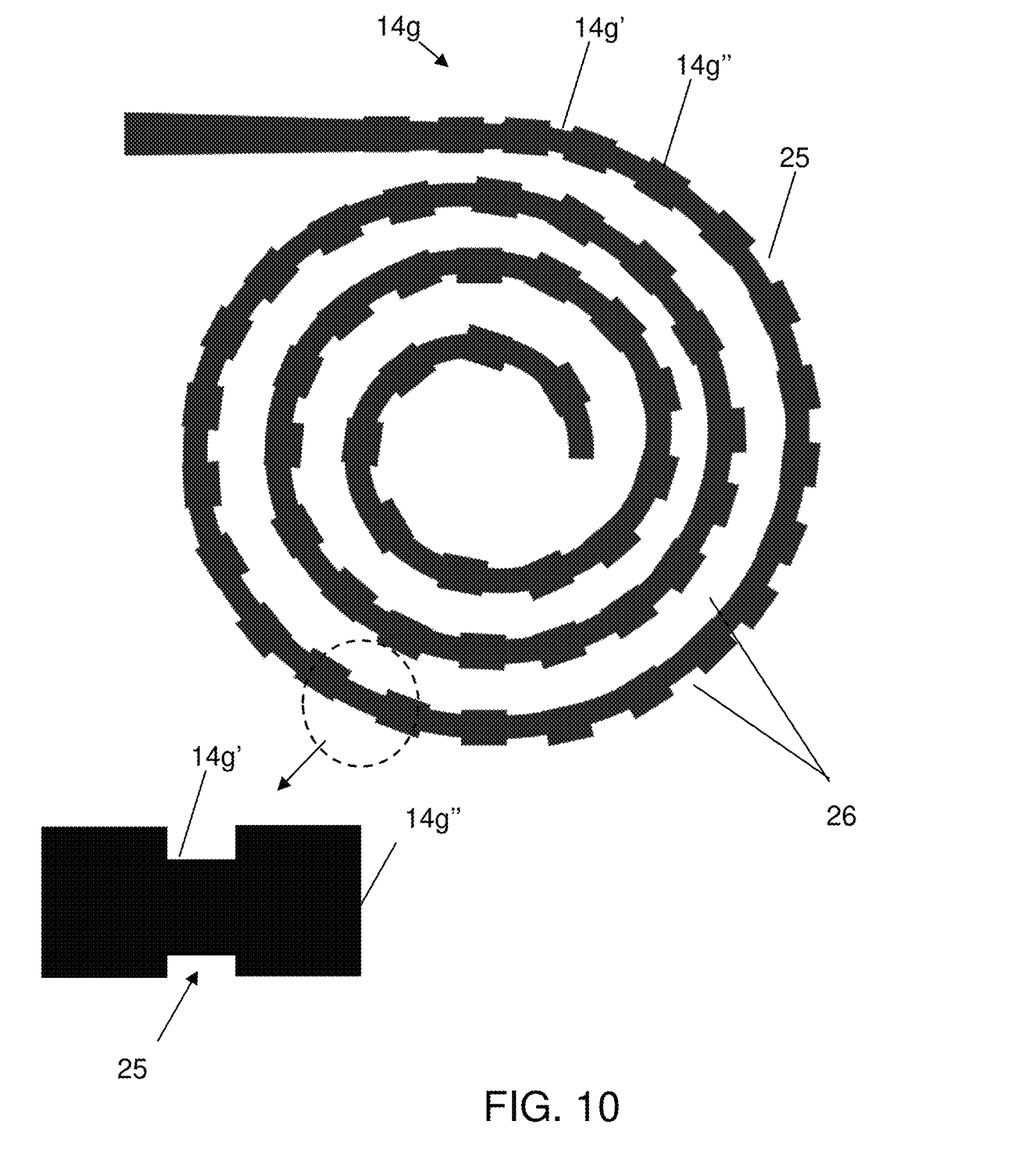
FIG. 10 shows a spiral waveguide structure composed of alternating narrow regions and wide regions, and respective fabrication processes in accordance with aspects of the present disclosure.

FIG. 10 shows a spiral waveguide structure 14g composed of alternating narrow regions 14g' and wide regions 14g". In this implementation, insulator material 26, e.g., oxide, is provided between the spirals, as well as within gaps or voids 25 formed between a pair of the wide regions 14g'. That is, gaps or voids 25 are formed adjacent to the narrow regions 14g' and between a pair of the wide regions 14g'. The gaps or voids 25 can have dimensions similar to that described with respect to the voids of the grating patterns of FIGS. 1-9.

As in the previous embodiments, the spiral waveguide structure 14g can be composed of Si material, SiN material or polysilicon, as examples. In addition, it is contemplated that the spiral waveguide structure 14g can be a doped Ge material. Also, the spiral waveguide structure 14g can sit on a slab or base of the same material. In this latter scenario, the spiral waveguide structure 14g is a partially etched spiral waveguide structure as already described herein.

Still referring to FIG. 10, in an Si, SiN or Ge implementation, the spiral waveguide structure 14g can be doped with P-type dopants or N-type dopants to minimize scattering loss. For example, the P-type dopants can include, e.g., Boron (B), and the N-type dopants can include, e.g., Arsenic (As), Phosphorus (P) and Sb, among other suitable examples. In the scenario that the spiral waveguide structure 14g sits on a slab or base of the same Si material, the base would also be doped with the same dopant type.

In alternative embodiments, different dopant types can be used for the alternating narrow regions 14g' and wider regions 14g". For example, the P-type dopant can be used for the narrow regions 14g' and the N-type dopant can be used for the wider regions 14g", or vice versa. In the situation that the spiral waveguide structure 14g sits on a slab or base of the same material, the base would also be doped with the same dopant type extending from the narrow regions 14g' and wider regions 14g".

The narrow regions 14g' and wider regions 14g" can be doped using an ion implantation process, prior to or after the patterning process. In the ion implantation process, respective patterned implantation masks may be used to define selected areas exposed for the implantations. In the case of different implant types, for example, the implantation mask used to select the exposed area for the first implant type is stripped after implantation, and before the implantation mask used for the second implant type. Similarly, the implantation mask used to select the exposed area for the second implant type is stripped after that implantation is performed. The implantation masks may include a layer of a light-sensitive material, such as an organic photoresist, applied by a spin coating process, pre-baked, exposed to light projected through a photomask, baked after exposure, and developed with a chemical developer. Each of the implantation masks has a thickness and stopping power sufficient to block masked areas against receiving a dose of the implanted ions.

Figure 11:
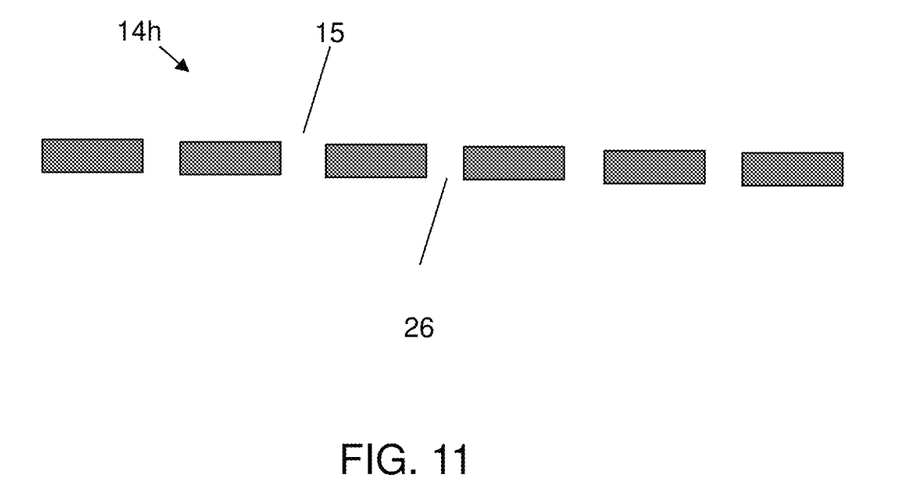
FIG. 11 shows a straight waveguide absorber with a grating pattern, amongst other features, and respective fabrication processes in accordance with aspects of the present disclosure.

FIG. 11 shows a straight waveguide absorber 14h with a grating pattern 15. As with the previous embodiments, the grating pattern 15, e.g., gaps, are filled with insulator material. Also, the straight waveguide absorber 14h can be composed of Si, SiN or polysilicon, as examples. The duty cycle can be 0.2-0.8 for the solid Si material, as an example; although other pitches and dimensions are contemplated herein depending on the performance requirements as already described herein.

The waveguide absorber can be utilized in system on chip (SoC) technology. It should be understood by those of skill in the art that SoC is an integrated circuit (also known as a "chip") that integrates all components of an electronic system on a single chip or substrate. As the components are integrated on a single substrate, SoCs consume much less power and take up much less area than multi-chip designs with equivalent functionality. Because of this, SoCs are becoming the dominant force in the mobile computing (such as in Smartphones) and edge computing markets. SoC is also commonly used in embedded systems and the Internet of Things.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure comprising:
a waveguide absorber with a grating pattern, wherein the waveguide absorber comprises alternating wide regions and narrow regions, and the grating pattern is a gap between a pair of the wide regions and adjacent to the narrow region between the pair of the wide regions, wherein the waveguide absorber is provided in a spiral configuration and the spiral configuration comprises concentrically placed rounded turns.

2. The structure of claim 1, wherein the grating pattern comprises gaps within the waveguide absorber.

3. The structure of claim 2, wherein gaps are filled with insulator material.

4. The structure of claim 2, wherein the waveguide absorber is one of Si material of silicon on insulator (SOI) technologies, SiN material and polysilicon material.

5. The structure of claim 2, wherein the spiral configuration comprises concentrically placed quadrilateral turns.

6. The structure of claim 1, wherein the gap between the pair of the wide regions and adjacent to the narrow region is filled with insulator material.

7. The structure of claim 1, wherein the alternating wide regions and narrow regions are doped with a same dopant type.

8. The structure of claim 1, wherein the alternating wide regions and narrow regions are doped with different dopant types.

9. The structure of claim 1, wherein the waveguide absorber is provided on a monolithic base of a same material as the waveguide absorber.

10. The structure of claim 1, wherein the waveguide absorber is provided on a monolithic base of a same material as the waveguide absorber and the grating pattern is partially removed material from the monolithic base.

11. A structure comprising:
a waveguide absorber comprising sections of discontinuous, separated semiconductor material; and
gaps between each of the sections of discontinuous, separated semiconductor material;
wherein the waveguide absorber comprises alternating wide regions and narrow regions, with the gaps between a pair of the wide regions and adjacent to the narrow region between the pair of the wide regions,
wherein the waveguide absorber is provided in a spiral configuration and the spiral configuration comprises concentrically placed rounded turns.

12. The structure of claim 11, wherein the discontinuous semiconductor material is one of Si material of silicon on insulator (SOI) technologies, SiN material and polysilicon material.

13. The structure of claim 11, wherein the waveguide absorber is provided on a monolithic base of a same material as the waveguide absorber and the gaps are partially removed material from the monolithic base.

14. The structure of claim 11, wherein the alternating wide regions and narrow regions are doped.

15. A structure comprising:
a semiconductor waveguide component;
a waveguide absorber composed of semiconductor material with voids between discrete, separated sections of the semiconductor material which form a grating pattern between the discrete, separated sections of the semiconductor material of the concentrically configured spiraled waveguide absorber;
a slab of thinned semiconductor material composed of a same semiconductor material as the waveguide absorber, the semiconductor material of the waveguide absorber being integral with the slab;
an insulator material directly contacting both the slab of thinned semiconductor material and the semiconductor material of the waveguide absorber, the insulator material also filling the voids between the semiconductor material of the waveguide absorber; and a dielectric material being in direct contact on a top surface of the insulator material and over the semiconductor material of the waveguide absorber and the slab.

16. The structure of claim 15, wherein the waveguide absorber is provided on a monolithic base of a same material as the waveguide absorber.

17. The structure of claim 15, wherein the dielectric material is directly in contact on the top surface of the insulator material and the dielectric material is different than the insulator material.

18. The structure of claim 15, wherein the waveguide absorber is a spiral waveguide and a width of the spiral waveguide varies along its propagation length such that $w1>w2>w3>w4>w5$.

19. The structure of claim 15, wherein the voids comprise a thinned portion of the slab between the semiconductor material of the waveguide absorber, such that the semiconductor material of the waveguide absorber and the thinned portion of the slab alternate with one another to form each spiral of the spiraled waveguide absorber.

20. The structure of claim 19, wherein the void is concentrically in alignment with the waveguide absorber to form the each spiral of the spiraled waveguide absorber.

* * * * *